United States Patent [19]
Shelton

[11] 3,943,493
[45] Mar. 9, 1976

[54] SHARED PROCESSOR DATA ENTRY SYSTEM

[75] Inventor: Richard M. Shelton, Oreland, Pa.

[73] Assignee: Sperry Rand Corporation, Blue Bell, Pa.

[22] Filed: Mar. 13, 1974

[21] Appl. No.: 450,646

[52] U.S. Cl. .......................................... 340/172.5
[51] Int. Cl.² ........................................ G06F 15/02
[58] Field of Search .......... 340/172.5; 235/152, 156

[56] References Cited
UNITED STATES PATENTS

| | | | |
|---|---|---|---|
| 3,525,079 | 8/1970 | Cuccio............................ | 340/172.5 |
| 3,573,854 | 4/1971 | Watson et al..................... | 340/172.5 |
| 3,638,197 | 1/1972 | Brennan, Jr. et al. ........... | 340/172.5 |
| 3,657,706 | 4/1972 | Horgan et al. ................... | 340/172.5 |
| 3,747,071 | 7/1973 | Haynes ............................. | 340/172.5 |

Primary Examiner—Joseph F. Ruggiero
Attorney, Agent, or Firm—John B. Sowell; Marshall M. Truex; William Cleaver

[57] ABSTRACT

A data entry system having a plurality of data entry key stations each having its own inexpensive, random access magnetic storage device with removable media and visual display connected to a common shared processor. Data characters of data records which are entered at the key stations are transferred to the shared processor and then transferred to a data buffer memory and to the visual display character by character. Data records assembled in the data buffer memory are transferred to the magnetic storage devices to provide a semi-permanent record file which is transferrable to a host processing unit.

14 Claims, 2 Drawing Figures

SHARED PROCESSOR DATA ENTRY SYSTEM

BACKGROUND OF THE INVENTION

1. Field of the Invention

This invention relates to data entry devices and systems. More particularly, the invention relates to an improved multiple key station data entry system of the shared processor type.

2. Description of the Prior Art

Data entry systems employing shared processors are known. One well known system employs key stations for entering data directly into a fast access mass memory disk storage system. Areas of the preformatted disk are assigned to individual key stations. Usually, the assigned areas are large enough to accommodate the normal daily work input through each key station; however, the total disk storage capability must be greater than the average configuration or norm expected, consequently, a large portion of the memory disk storage capacity is not utilized. Since some key station operators may be much faster than the norm or average, their assigned area may become filled well before a complete working day. The capacity problem is even worse when a particular job calls for updating data records or making partial entries which results in a greater output of entries in a working day. The more flexible prior art shared processor systems require as a part of the system a tape storage device having standard half inch tape drive and an associated tape controller. This arrangement permits the accumulated data records stored in the mass memory disk storage system to be periodically transferred to magnetic tape. The magnetic tapes may then serve as a temporary or permanent storage record. Most tape storage systems have standard formats for direct entry into a host central processing unit with a minimum of modification, thus become a suitable means for buffer storage.

Prior art shared processor data entry systems have very high initial costs and when employed with a small number of key stations are not economically justifiable. When too many key stations are employed with one mass memory disk file storage system, the access time of the moving head disk file system is too great to accommodate the number of records attempting to be entered randomly per unit of time. It can be shown that head positioning time and random access time of a disk storage system creates a practical limit to the number of key stations that are effectively utilizable with the prior art systems.

Data entry systems employing inexpensive magnetic storage devices with removable diskettes or cartridge tapes have been used in data entry systems and word processors, but such systems have not been employed with shared processors. One well known data entry system provides a key station having a keyboard, a visual display, a diskette drive and a processor for each single or dual station arrangement. The individual processor is limited to only basic programs required to enter data records on the diskette. The data recorded on the diskettes must be physically removed from the key stations and placed in a reader or converter which includes a tape controller, a tape drive and another processor. The records assimilated on such tape are stored for later use as in input to a host central computer. Since the above-described data entry system is intended for off-line operation, the readers or converters are independently free-standing units similar to the key stations. Such prior art data entry systems have very limited format performance. Manual handling of the diskettes and of the resulting tape may require personnel skilled at several different jobs and may require supervisory activities which are not needed on shared processor data entry systems. Key stations having individual diskette systems and processors are not economically competitive with shared processor systems having a large number of key stations.

SUMMARY OF THE INVENTION

The present invention provides a shared processor data entry system which is operable with one or more key stations. The invention utilizes at each key station removable magnetic memory storage media, preferably a flexible diskette. Not only does the flexible disk provide a permanent and low cost data storage at least an order of magnitude less expensive than rigid central disc subsystems, but each key station is independently operable with the central shared processor, and there is no system shut-down should a diskette storage device malfunction or become inoperable.

The present invention utilizes character by character entry from the key stations to the central processor which permits the system to monitor, edit, augment, check or format all data entries as they are entered into the buffer memory of the central shared processor. Although each operator's diskette normally holds more than eight hours work, the effective capacity of the key station is infinite since the diskette storage media is removable and a new diskette may be substituted in a matter of seconds. Since each key station has its own diskette storage device, the access or waiting time is not dependent on other key station activity, and a very large number of such key stations may be added to the present system without impairing the speed of operation.

The present invention is further provided with an input-output buffer for entering data records into the diskette storage devices or reading data records from the diskette storage devices. The data records may be read into a standard medium of interchange for a host central processing unit such as a magnetic tape system or, alternatively, through a direct connection to a channel of the host processing unit, thus, eliminating the medium of interchange. In the preferred embodiment the diskette storage devices are operable either in an on-line basis so that the data records are directly entered into a host processing unit or recorded on an interchange memory tape in proper format for transfer to a host central processing unit.

A principal object of the present invention is to provide an improved shared processor data entry system with operational advantages over prior art systems.

Another object of the present invention is to provide an economical reliable magnetic storage device at each key station which has a much lower initial cost than systems employing central mass memory storage devices.

Another object of the present invention is to provide each key station operator with direct means for updating, changing or modifying their data records with a minimum of system activity or interruption.

Another object of the present invention is to provide a key station means for altering the stored program contents of the shared processor.

Another object of the present invention is to provide means for automatically transferring data recorded in the diskettes to a host central processing interface or to a tape device without need for operator handling or a separate reader.

Another object of the present invention is to provide a clustered keyboard data entry system which has low fixed costs and has modular disk storage so that the system is economical for a large number of key stations as well as a small number of key stations.

A further object of the present invention is to provide a data entry system adapted to accept data entry input from devices other than key stations and to generate data output to printing devices or convert externally recorded diskettes to a form acceptable to host equipments.

In accordance with these and other objects of the present invention, there is provided a plurality of data entry key stations each having its own keyboard, magnetic storage device with removable media and visual display connected to a common shared processor. The magnetic storage devices are low cost in nature and of sufficient capacity to store more data than a fast operator can accumulate in one day. The memory media is removable and portable to provide the user with a convenient physical or temporary record and safety back-up as well as to permit operational analysis of inputs. Data is entered into the shared processor and visual displays character by character and into the memory devices record by record, thus eliminating delays which limit system capacity. Output from the memory devices may be transferred record by record, or a plurality of such records may be read during one transfer. The present system makes shared processor data entry systems cheaper for small system installations yet provides a system which can be enlarged by the addition of key stations. The individual key stations have their own mass memory storage; thus, the addition of key stations does not diminish the mass storage available for each operator. Since the individual diskette storage devices have their own read-write heads, key stations do not compete for access to the mass memory. The removable and reusable diskettes may be employed to avoid excessive data transfer between disk devices and tape devices. Search and up-dating operation may be accomplished without resort to tape searches and/or recording in mass memory. Purging of mass memory is eliminated; back-up tapes may be eliminated.

DESCRIPTION OF THE PREFERRED EMBODIMENT

Figure 1:
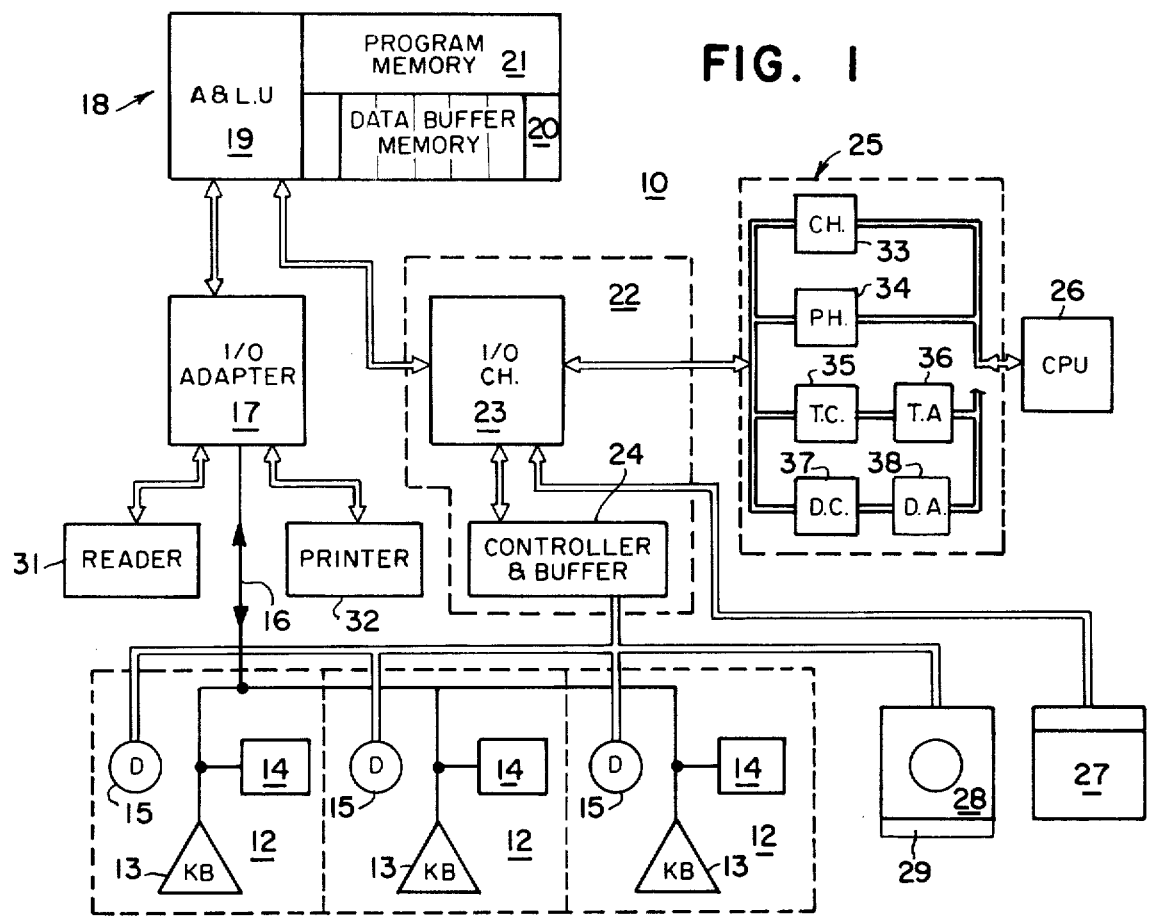
FIG. 1 is a diagrammatic illustration of the preferred embodiment shared processor data entry system.

Referring now to FIG. 1, there is shown a data entry system of the shared processor type. The shared processor system 10 includes a plurality of key stations 12, each comprising a keyboard 13, a visual display 14 and a magnetic storage device 15 having a removable and reusable storage media. In the preferred embodiment the storage device 15 comprises a flexible disk storage media with a simple screw type locating and positioning read-write head and simple interlocks on the cover or the cabinet. Data entered at the keyboards 13 is transferred on serial line 16 and input-output adapter 17 to processor 18. The keyboards 13 and visual displays 14 are scanned by the central shared processor 18 and connect to the processor 18 for a limited time during the scan. The processor 18 comprises an arithmetic and logic control unit 19, a data buffer memory unit 20 and a programmable memory 21.

The central processor 18 scans each key station 12 in sequence and receives a character at a time from the keyboards 13 over the serial connection 16. Data received from the keyboard by the input-output adapter 17 is directed to the arithmetic and logic unit 19. Each character as received by the arithmetic and logic unit is checked and validated by the processor against the operative format in program memory 21 and placed in the respective data buffer memory 20 for the keyboard 13 supplying the data. Data stored in data buffer memory 20 is also sent via input-output adapter 17 over line 16 to the visual display 14 for the key station. If a character is determined to be invalid, it is not stored in the data buffer memory 20, and an error indication is transferred from program memory via the arithmetic and logic unit 19 and the input-output adapter 17 to the visual display 14 at the key station generating the invalid data. It will be understood that the function of the input-output adapter 17 may be embodied in the central shared processor 18 or placed in the same cabinet therewith.

During normal operation each key station 12 is manned by an operator working from business documents to enter, verify, update or search data in the system by interacting with the processor 18. Characters entered from keyboards 13 are processed character by character and stored in the data buffer memory 20 of the processor 18 until such time as a full record is completed. When the operator depresses the enter key on the keyboard, the data record recorded in data buffer memory is released and transferred to the input-output control means 22 comprising input-output channel 23 and controller and buffer 24. The arithmetic and logic unit 19 of processor 18 initiates the write operation in respect to the diskette drive 15. Data records written in diskette storage device 15 may be transferred back to the controller and buffer 24 after the write operation is complete. The data record may then be transferred back to data buffer memory 20 or to the means for supplying data to the central processing unit 25 via the input-output channel 23. In normal operation, the read and write operations are interspersed with keyboard scanning and other processing operations. The storage devices 15 each store several hundred thousand characters and have an overall access time of a fraction of a second. If the diskette storage media should be filled or it is desirable to shift to a new storage media for other purposes, the original storage media is removed by hand and a new storage media is inserted in its place in a matter of seconds. In the event that storage device 15 at any one of the key stations 12 should incur mechanical failure of malfunction, only one of the key stations to the system is shut down, and the operator may be employed at another similar key station 12.

The process of data entry is controlled entirely by the central shared processor 18 and the program stored in program memory 21. Data characters entered from a keyboard 13 are processed before being stored in data buffer memory 20, displayed at displays 14 or recorded in the magnetic storage devices 15. The data buffer memory 20 provides two full records of storage for each key station 12 to permit functional operations such as duplicating, verifying and searching operations.

When operating in the update mode, data records which are previously recorded in data storage device 15 may be read and stored in data buffer memory 20. The operator may utilize any appropriate format stored in program memory 21 and can update the record in the data buffer memory 20 by only keying those fields or characters which are to be changed since the previous recording. A prime advantage of this mode of operation is to change records with the minimum amount of keyboard entries or data transfers, thus speeding operations and eliminating the possibility of error. If the data being employed to update the data record is used on all records, the data may be entered once in memory and the operator may recall this as a constant (or repeat) for entry into the updated record.

In the verify mode of operation, the operator may enter at keyboard 13 the identical information which has already been recorded in data storage device 15, and by initiating the verify mode can determine if the original entry was correct. For some forms of data records one hundred per cent verification is required. In the verify mode of operation, the data entered at keyboard 13 may be compared character by character, field by field or record by record.

Data records stored in storage devices 15 may be transferred to means for supplying data to a central processing unit 25 and subsequently to a host processing unit 26 or may be transferred direct as will be explained. Data records stored in data storage devices 15 may be reformatted before being transferred to means 25. When the data records in storage devices 15 are to be reformatted, they are transferred through controller and buffer 24 to the input-output channel 23 and to the central shared processor 18 where the data records are reformatted or otherwise modified. Data records so modified may be transferred directly to input-output channel 23 and to means 25 for subsequent entry into the host computing unit 26 (CPU). In this manner data transferred to the host computing unit 26 can be presented in a sequence or format other than that which was entered at keyboards 13 and recorded at data storage devices 15. In the event there is a need for reformatting the data in the data storage devices 15, this can be done directly by programs in the central shared processor 18 in a form compatible with the host computer unit 26. An auxiliarly diskette reader 27 may also be attached to the input-output channel 23 for converting diskettes which have been prepared on other systems for direct entry into the present system or for conversion to the proper output format for entry into the host computer unit 26.

The programming information necessary for performing functional operations called for by keyboard operators and other microprograms are stored in the program memory 21. During start-up operations following power turn-on, the program information is loaded into the program memory 21 from a supervisory magnetic storage device 28. Since this supervisory storage device is capable of containing a very large number of programs, it may be left on-line so that programs that are not normally required by the system may be entered from time to time in the program memory 21. During normal operation the operator at key stations 12 may alter the stored contents of program memory 21 by causing program segments in the supervisory diskette 28 to be swapped with programs currently residing in memory 21. The supervisory magnetic storage device 28 also stores a number of record formats prepared by the operator to define the various field boundaries within a record set. These formats are called upon by the operators and stored in memory 21. The formats are functionally analogous to program cards in a keypunch environment and are used during ordinary keyboard entry operations.

The supervisory magnetic storage device is also provided with a keyboard 29 which enables the supervisor to directly swap program information in the shared central processor. The supervisory keyboard 29 can also be used to interrogate the processor or to effect input or output from a card reader 31 and/or printer 32. The data portion of memory 20 may be expended to record statistical data, thus keeping an accurate account of the number of records entered at each key station and the number of errors which occurred during the entry of the data records. The supervisor can read this information out of the data portion of memory 20 and have it printed out on the printer 32 or alternatively can have the information displayed on the CRT of a key station.

Means for supplying data to a central processing unit 25 comprise several alternative available devices. Interface channel 33 provides a means of entering data records directly into the host processor 26. The phone connection 34 is another direct means of entering data records into the host processor 26. Tape control 35 and its associated tape drive apparatus 36 provides a permanent record as well as a buffer for entering data records into the host processor. Data records are recorded in the tape apparatus 36 in a standard format which is acceptable to most computers, and the resultant tapes can be carried to a host central processing unit 26. Disk controller 37 and associated disk drive apparatus 38 provide an alternative random access mass memory device which may be loaded with data records which are later transferred to the host central processing unit 26. The means for supplying data to a central processing unit 25 are well known, and in different system environments have both advantages and disadvantages. The present data entry system provides means for utilizing any of the commonly used methods for entering data into a host processing unit.

Figure 2:
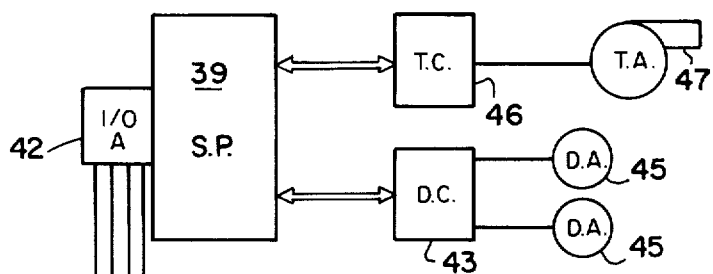
FIG. 2 is a diagrammatic illustration of a typical prior art shared processor data entry system.

Refer now to FIG. 2 showing a typical prior art data entry system employing a central shared processor 39. Individual keyboard stations 41 are ordinarily connected to an input-output adapter 42 for entry into a central shared processor 39. The data characters entered at keyboard stations 41 are entered into processor 39 character by character where they are transferred to the disk controller 43 and subsequently transferred to a disk drive apparatus 44 or 45. Information recorded character by character on the disk apparatus 44 or 45 is assimilated in the form of a data record and subsequently transferred or read back through the disk controller 43 to the processor 39 and transferred as a record to the tape control 46 and then to the tape apparatus 47. Most mass memory disk drive apparatus employ moving heads for seeking the channel in which data records are to be recorded or to be read. It will be understood that the moving head of a disk apparatus is being randomly moved back and forth to various positions assigned to individual keyboard stations 41 in order to record a character in the disk drive apparatus 44 or 45. In similar manner the motion of the head must seek data records for readback to the tape apparatus 47. In the prior art system such as that shown briefly in FIG. 2, there is a need for both the disk apparatus 44, 45 and the tape apparatus 47 to accommodate the mode of operation presently employed in most such shared processor data entry systems. Even if the prior art systems utilized a direct connection to a host processor via a channel or phone line as shown in means 25, the tape subsystem would still be required to purge the disk periodically and provide the user with data back-up. The initial expense of such prior art systems is excessive for a small number of keyboard stations. The mode of operation of the system is inefficient in that individual keyboard stations are competing for use of the mass memory device, and in the event of a breakdown or malfunction of either of the mass memory devices associated with the prior art systems, every keyboard station is shut down.

What is claimed is:

1. A shared processor data entry system of the type having a plurality of key stations adapted to supply data to a central processing unit comprising:
    a plurality of key stations for producing data characters indicative of data records, each said key station having an associated keyboard, visual display and a magnetic storage device having a removable medium for storing data records,
    a central shared processor connectable to said key stations,
    said processor having a programmable memory unit, an arithmetic and logic unit and a data buffer memory unit,
    said processor providing means for directing character by character input data from said key stations into said data buffer memory unit and for directing character by character output to said associated visual displays,
    means for supplying data to a host processing unit, and
    input-output control means connected between said shared processor, said magnetic storage devices and said means for supplying data to a host processing unit,
    said processor being programmed to transfer data records stored in said data buffer memory unit to said magnetic storage devices and to subsequently transfer said records stored in said magnetic storage devices to said means for supplying data to a host processing unit.

2. A shared processor data entry system as set forth in claim 1 wherein said magnetic storage devices comprise rotating magnetic disk means.

3. A shared processor data entry system as set forth in claim 2 wherein said magnetic disk means comprise a single removable diskette exposed to a read-write head on one of its surfaces.

4. A shared processor data entry system as set forth in claim 1 wherein said input-output control means comprise a magnetic disk controller and an input-output channel connectable to said means for supplying data to a host processing unit.

5. A shared processor data entry system as set forth in claim 4 wherein said means for supplying data to a host processing unit comprises a magnetic mass storage system connected to said input-output channel means for receiving data records recorded in said magnetic storage devices under control of said processor.

6. A shared processor data entry system as set forth in claim 5 wherein said magnetic mass storage system comprises a tape transport apparatus.

7. A shared processor data entry system as set forth in claim 1 which further includes a host processing unit connected to said means for supplying data to said host processing unit for receiving data recorded in said magnetic storage devices under control of said shared processor.

8. A shared processor data entry system as set forth in claim 1 which further comprises an input-output adapter intermediate said processor and said key stations for connecting said key stations to said processor.

9. A data entry system as set forth in claim 8 which further includes a printer connectable to said input-output adapter means.

10. A data entry system as set forth in claim 1 which further includes a supervisory magnetic storage device capable of transferring program instructions to said central shared processor through said input-output control means.

11. A data entry system as set forth in claim 1 which further includes an auxiliary diskette reader capable of transferring data records recorded in different format from said magnetic storage device to said means for supplying data to said host processing unit through said input-output control means.

12. A shared processor data entry system as set forth in claim 11 wherein said auxiliary diskette reader further includes a format control and is connected directly to said input-output channel of said input-output control means.

13. A shared processor data entry system as set forth in claim 7 wherein said means for supplying data to a host processing unit comprises a channel interface connected between a channel of the host processing unit and said input-output channel means.

14. A shared processor data entry system as set forth in claim 7 wherein said means for supplying data to a host processing unit comprises a phone link connected between a channel of the host processing unit and said input-output channel means.

* * * * *